UNITED STATES PATENT OFFICE.

FRANK DIBBEN, OF NEW YORK, N. Y.

IMPROVEMENT IN PROCESSES FOR TREATING SILVER ORE.

Specification forming part of Letters Patent No. 180,756, dated August 8, 1876; application filed September 9, 1875.

*To all whom it may concern:*

Be it known that I, FRANK DIBBEN, of New York city, county of New York, and State of New York, have invented a Treatment of Silver Ores, of which the following is a specification:

My invention consists in a further treatment of silver ores, after they have been subjected to any of the usual processes of amalgamation. Its purpose is to recover a large part of the quicksilver, which, in the present methods of working, is known to be lost. By my process the insoluble subchloride of mercury, and other mercurial compounds, are in large part, converted into soluble perchloride of mercury, afterward reduced to the metallic state by the treatment with zinc, also the metallic particles of mercury that are in a "floured" condition, are aggregated.

After the ore has been operated upon in any of the usual ways in the amalgamator, and after it has been separated from the bulk of the amalgam, I place it, still wet and of a pulpy consistency, in a convenient vessel—as, for example, a wooden tub—and then add to it chlorine or hydrochloric acid. In case the ore contains carbonate of lime, other matter incompatible with hydrochloric acid, I use the chlorine, and in all other cases I use the acid, or a mixture of acid and chlorine, having a preference for the acid, on account of its smaller cost; or, instead of the acid or chlorine, simply and directly, I add to the ore the materials which will produce them—as, for example, salt and sulphuric acid, to generate hydrochloric acid, and peroxide of manganese and hydrochloric acid, to produce chlorine. When I use hydrochloric acid alone, the quantity required per ton of ore is from three to five pounds, and when I use chlorine, I use a quantity which would be the chemical equivalent of the acid named. After the addition of the acid or chlorine, the mixture is left to digest for from twelve to twenty-four hours, subjecting it to heat in the interim. After the digestion, the mixture is brought into a separator or settler, when I add thereto about one-half pound of pulverized zinc per ton of ore. The mass is now stirred for some hours, without adding water. After this, water is added, and the separation continued and completed in the ordinary way, when, at last, there will be left a zinc silver amalgam containing most of the mercury, which, in the old process, would have been lost. In the case of the ore containing carbonates, I sometimes carry out the treatment with chlorine and zinc in the separator, without intermediate vessel.

Having now described my process, what I claim as new therein, and desire to secure by Letters Patent, is—

The process of treating the tailings of silver ores, which process consists of the following steps: first, the digestion of the tailings with hot diluted hydrochloric acid or chlorine; second, the agitation of the digested acid mass with powered zinc, substantially as described.

FRANK DIBBEN.

Witnesses:
CHARLES EDGAR MILLS,
W. R. HOLBROOK.